April 21, 1942.  S. SEGAL  2,280,084
LATCH
Filed Feb. 26, 1940
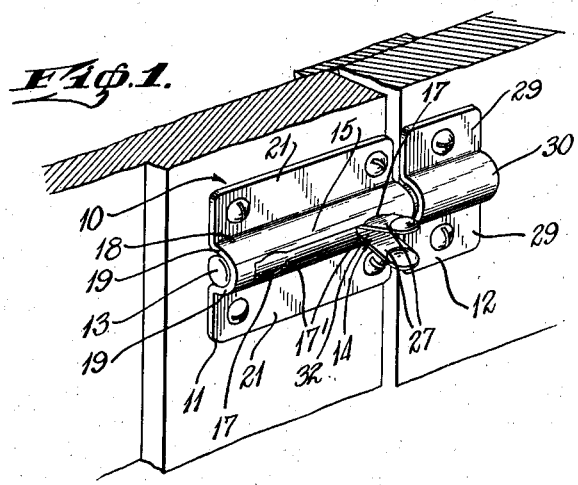
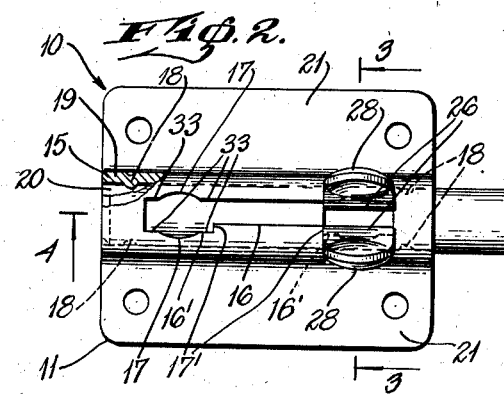
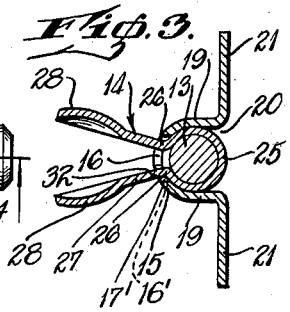
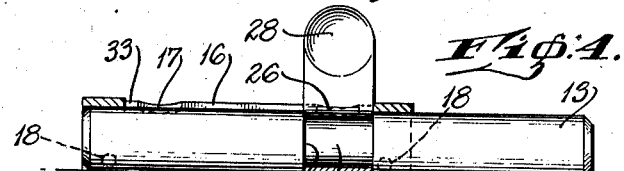
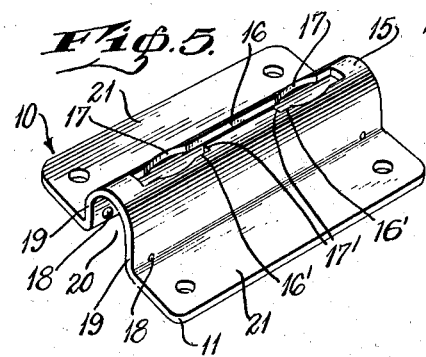
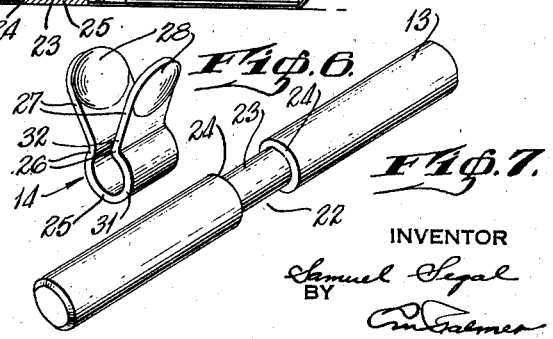
INVENTOR
Samuel Segal
BY
ATTORNEY Patented Apr. 21, 1942

2,280,084

UNITED STATES PATENT OFFICE 2,280,084

LATCH

Samuel Segal, Brooklyn, N. Y.

Application February 26, 1940, Serial No. 320,958

2 Claims. (Cl. 292—152)

This invention is a latch.

The object of the invention is to provide a novel and improved latch having a simplified structural organization permitting:

1. Ease of assembly
2. Less cost to manufacture
3. The utilization of a multi winged and resilient manipulator effectively interlocked with a bolt thereof and projecting through and transversely of the guard of the latch to effectively hold the sliding bolt in an operative or inoperative latching relation in respect to a fixed keeper, and
4. The employment of a guard having detent means to allow the bolt to be snapped into a guide bearing running lengthwise of the guard, the detent means further serving to prevent transverse displacement of the bolt relative to the guide bearing and also constituting guide means to facilitate slidable displacement of the bolt longitudinally of the guard.

Further objects, advantages, and functional and structural features of the invention will appear from the teachings of the following detailed disclosure considered in connection with the accompanying drawing wherein:

Fig. 1 is a perspective view of the latch according to my invention.

Fig. 2 is a front elevation thereof, partly in section.

Fig. 3 is a sectional view on the line 3—3 of Fig. 2.

Fig. 4 is a longitudinal sectional view on the line 4—4 of Fig. 2.

Fig. 5 is a perspective view of the guard.

Fig. 6 is a perspective view of the multi winged manipulator or clip, and

Fig. 7 is a perspective view of the slidably guided bolt.

The latch 10 comprises:

1. Guard 11
2. Keeper 12
3. Bolt 13, and
4. The multi winged strap or manipulator 14.

The guard 11 is a one piece metal member and has:

1. The curved bearing 15 coextensive with the length thereof
2. The elongated slot 16 interrupted by the aligned lower cutaway portions 16' and the aligned notches 17 in the upper wall of slot 16 and the lower wall of the cutaway portions 16', the latter with the lower wall of slot 16 forming stop shoulders 17'
3. Detents or projections 18 struck out of the upper and lower side portions 19 of the bearing 15 and extending inwardly of the bearing or opening 20 which is in communication with slot 16 and notches 17, and
4. The wings 21 which are integral with curved bearing 15.

The bolt 13 has:

1. The elongated cylindrical shank as shown provided with notch or groove 22 defining:
2. The reduced portion 23, and the spaced shoulders 24.

The manipulator 14 is in the form of a U-shaped sheet metal clip or resilient strap having:

1. The socket or eye 25 merging with the retaining lips 26 which in turn merge with the outwardly diverging and spaced wings 27 having the outwardly struck curved manipulating portions 28.

The keeper 12 is of the conventional type and is provided with:

1. Wings 29 and
2. The integrally merged bolt retaining means 30.

In the matter of assembly, the bolt is first located on the clip 14.

To this end, the reduced portion 23 is positioned into the gap between wings 27, and onto stop lips 26 which are spaced apart a distance less than the diameter of the reduced portion 23.

Thereafter socket 25 is forced towards the reduced portion 23.

This action causes lips 26 to diverge and snap over the reduced portion 23 and the inherent resiliency of the loop 31 of the socket automatically retracts the lips thus preventing transverse displacement of the clip relative to the bolt.

The width of the clip is commensurate with the length of the groove 22 and thus shoulders 24 straddle or interlock with the sides of the loop and hence displacement of the clip longitudinally of the bolt is prevented.

With the loop and bolt assembled as described, manipulating portions 28 of the wings 27 are grasped and moved towards each other and threaded through one of the larger openings defined by a pair of aligned notches 17 interrupting slot 16.

It follows that the bolt is positioned longitudinally of the guard and to more positively locate the bolt however within the bearing 15 of the guard the bolt is snapped by the projections or detents 18, which slidably confine the bolt within the bearing.

Immediately after the bolt has snapped by the detents 18, the resiliency of the eye 25 causes wings 26 automatically to diverge outwardly and in such relation, lower portion 32 thereof can be moved to snap into one of the retaining cutaway openings 16' and against its stop shoulder 17'. Thus the bolt is locked against longitudinal displacement although horizontal shoulders 33 limit the outward divergence of the wings 27.

As shown in Fig. 1, the bolt is latched within the socket 30 of the keeper. In this relation the normally diverged wings 27 may be grasped and moved towards each other, thus portion 32 of the lower wing 27 is moved out of the right hand cutaway portion 16' and out of the path of the shoulder 17 thereof. Hence the bolt may be slidably displaced to the left or out of the keeper. It follows that the bolt of the latch is unlocked and the bolt may be retained in such relation by shifting the same so that the clip reaches the left hand cutaway portion 16' after which manual pressure is removed, and the portion 32 of the lower wing automatically interlocks with the left hand shoulder 17'. It is thus apparent that with the present invention, the guard has means to disengageably interlock with a manipulating wing of the resilient and flexible clip or strap to retain the bolt in either a locked or unlocked relation.

While the invention has been specifically described in detail, it is to be understood that it is not limited to specific details described but it is capable of other adaptations and modifications within the scope of the appended claims.

I claim:

1. In combination, a guard having a bearing including a slot and spaced cutaway portions interrupting said slot, a bolt slidably guided by said bearing longitudinally of said guard, spaced detent means integral with and struck out of said guard adjacent said bearing to prevent displacement of said bolt transversely of said guard, a U-shaped manipulator interlocking with said bolt and having spaced wings disposed forwardly of said bearing and adapted to be arranged at least in part in one of said cutaway portions to prevent displacement of said bolt longitudinally of said guard and adapted upon manual pressure to be moved towards each other to be clear of said last mentioned cutaway portion to be projected into said slot and movable therealong until in alinement with another of said cutaway portions, and means upon removal of said pressure for automatically diverging said arms to permit at least a part of the latter to cooperate with said last mentioned cutaway portion to prevent longitudinal displacement of said bolt relative to said guard.

2. In combination, a guard having a bearing, a bolt slidably guided by said bearing longitudinally of said guard and comprising spaced shoulders and a reduced portion, spaced detent means integral with and struck out of said guard adjacent said bearing to prevent displacement of said bolt transversely of said guard, and a U-shaped strap having a socket straddling said reduced portion and straddled by said shoulders to prevent displacement of said strap longitudinally of said bolt.

SAMUEL SEGAL.